United States Patent
Chang et al.

(10) Patent No.: US 8,034,458 B2
(45) Date of Patent: *Oct. 11, 2011

(54) MULTILAYER FILM STRUCTURE FOR INCREASING TRANSMITTANCE AND METHOD FOR MANUFACTURING THE SAME

(75) Inventors: Cheng-Chieh Chang, Taipei (TW); Hsiu-Feng Liu, Jhongli (TW); Pi-Jui Kuo, Jhubei (TW)

(73) Assignee: Innovation & Infinity Global Corp., Hsinchu (TW)

( * ) Notice: Subject to any disclaimer, the term of this patent is extended or adjusted under 35 U.S.C. 154(b) by 250 days.

This patent is subject to a terminal disclaimer.

(21) Appl. No.: 12/404,556

(22) Filed: Mar. 16, 2009

(65) Prior Publication Data

US 2010/0233388 A1 Sep. 16, 2010

(51) Int. Cl.
*B32B 7/00* (2006.01)
*B32B 15/00* (2006.01)
*B05D 1/36* (2006.01)
*B05D 5/00* (2006.01)

(52) U.S. Cl. ........ 428/432; 428/216; 428/336; 428/472; 428/702; 428/688; 428/689; 428/697; 428/699; 428/701; 427/419.3; 427/125; 427/126.3; 427/162; 427/165; 427/404

(58) Field of Classification Search .................. None
See application file for complete search history.

(56) References Cited

U.S. PATENT DOCUMENTS

| | | | | |
|---|---|---|---|---|
| 2,908,553 A | * | 10/1959 | Frank et al. | 423/275 |
| 6,045,896 A | * | 4/2000 | Boire et al. | 428/432 |
| 6,916,542 B2 | * | 7/2005 | Buhay et al. | 428/432 |

* cited by examiner

*Primary Examiner* — Ling Xu
(74) *Attorney, Agent, or Firm* — Kile Goekjian Reed & McManus PLLC

(57) ABSTRACT

A multilayer film structure for increasing transmittance includes a transparent substrate and a multifunctional film module. The multifunctional film module is formed on a front surface of the transparent substrate and composed of a plurality of dielectric layers and a plurality of metal layers. The dielectric layers and the metal layers are alternately stacked onto each other, and each metal layer is formed by mixing at least two metals. Each dielectric layer is a silicon carbide compound layer that is SiC, and each metal layer is formed by mixing Ag and Cu.

6 Claims, 10 Drawing Sheets

MULTILAYER FILM STRUCTURE FOR INCREASING TRANSMITTANCE AND METHOD FOR MANUFACTURING THE SAME

BACKGROUND OF THE INVENTION

1. Field of the Invention

The present invention relates to a structure and a method for manufacture the same, and particularly relates to a multilayer film structure for increasing transmittance and a method for manufacturing the same.

2. Description of Related Art

In the prior art, the method for manufacturing a plasma display panel (PDP) filter comprises two steps. The first step is a sputtering process that includes forming a multifunctional film module on a transparent glass in order to generate functions such as anti-EMI, anti-reflection and near infrared ray absorption. The second step is: manufacturing a film with a coated dye to control color in order to conform to the required spectrogram, and then attaching the film with the coated dye onto the multifunctional film module of the transparent glass. The manufacturing of the PDP filter is accomplished by said two steps.

However, the spectrogram plot of the multifunctional film module has a curved shape because the metal used for the sputtering has different light-absorbing capabilities at different wavelengths.

For example, FIG. 1A shows a decreasing light absorption with increasing wavelength (between 400 nm and 700 nm) when Ag is used as the sputtered metal according to the prior art. In other words, the transmittance of light passing through Ag is least in the range of blue (about 400 nm~500 nm), the transmittance of light passing through Ag is medium in green light area (about 500 nm~600 nm), and the transmittance of light passing through Ag is highest in the red light area (about 600 nm~700 nm). Hence, when lights pass through the glass with Ag, the shades of color is non-average.

FIG. 1B shows a property diagram showing the relationship between the transmittance of light passing through a processed glass and the light wavelength according to the prior art. When light passes through a processed glass that has an anti-EMI (Electromagnetic Interference) layer such as Ag formed on its surface, the transmittance is different at different wavelengths. In particular, the transmittance of blue light approaches 90% (right-most area) and the transmittance of the wavelength close to red (left-most area) is reduced to nearly 10.

FIG. 1C shows the relationship between the transmittance of light passing through a PDP filter with the processed glass of FIG. 1B and the light wavelength according to the prior art. The anti-reflection wavelength area is not wide enough as shown in FIG. 1C, so that the difference in transmittance of three original color light cannot be complemented in the second part of controlling color. Hence, it is difficult to conform to the required spectrogram, and the chromatic characteristics of the PDP filter are bad.

SUMMARY OF THE INVENTION

One particular aspect of the present invention is to provide a multilayer film structure for increasing transmittance. The process of manufacturing the multilayer film structure in high volume production is highly reliable and has been routinely used in industries such as semiconductor manufacturing, disc head manufacturing, LCD manufacturing, CRT manufacturing, architecture glass manufacturing, touch sensor display manufacturing, screen filter manufacturing and plastic web for more than twenty years.

Moreover, the present invention uses a multifunctional film module (in order to generate some functions such as anti-EMI, anti-reflection and near infrared rays) as a sputtering layer formed on a transparent glass. The multifunctional film module includes a metal layer formed by mixing at least two metals such as Ag and Cu. Hence, the transmittance of light passing through a metal layer formed by mixing at least two metals such as Ag and Cu is shown as a horizontal line in spectrogram, so that the spectrogram of the multifunctional film module is shown as a trapezoid shape.

In order to achieve the above-mentioned aspects, the present invention provides a multilayer film structure for increasing transmittance. The multilayer film structure includes: a transparent substrate and a multifunctional film module. The multifunctional film module is formed on a front surface of the transparent substrate and composed of a plurality of dielectric layers and a plurality of metal layers. The dielectric layers and the metal layers are alternately stacked onto each other, and each metal layer is formed by mixing at least two metals.

In order to achieve the above-mentioned aspects, the present invention provides a method for manufacturing a multilayer film structure for increasing transmittance. The method includes: providing a transparent substrate; and then forming a multifunctional film module on a front surface of the transparent substrate. In addition, the multifunctional film module is composed of a plurality of dielectric layers and a plurality of metal layers, the dielectric layers and the metal layers are alternately stacked onto each other, and each metal layer is formed by mixing at least two metals.

Furthermore, with regard to the dielectric layers and the metal layers, there are four following embodiments:

1. First embodiment: each dielectric layer is a silicon carbide compound layer that is SiC, and each metal layer is formed by mixing Ag and Cu.

2. Second embodiment: each dielectric layer is a mixed layer that is composed of silicon carbide compound and Ti-based oxide, each silicon carbide compound is SiC, each Ti-based oxide is $TiO_2$, and each metal layer is formed by mixing Ag and Cu.

3. Third embodiment: each dielectric layer is a Ti-based oxide layer that is $TiO_2$, and each metal layer is formed by mixing Ag and Cu.

4. Fourth embodiment: each dielectric layer is a mixed layer that is composed of Ti-based oxide and carbon, each Ti-based oxide is $TiO_2$, and each metal layer is formed by mixing Ag and Cu.

Hence, the transmittance of light passing through the metal layer that is formed by mixing at least two metals such as Ag and Cu is shown as a horizontal line in spectrogram, so that the spectrogram of the multifunctional film module is shown as a trapezoid shape.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objectives and advantages of the present invention will be more readily understood from the following detailed description when read in conjunction with the appended drawings, in which.

DETAILED DESCRIPTION OF THE PREFERRED EMBODIMENTS

Figure 2A:
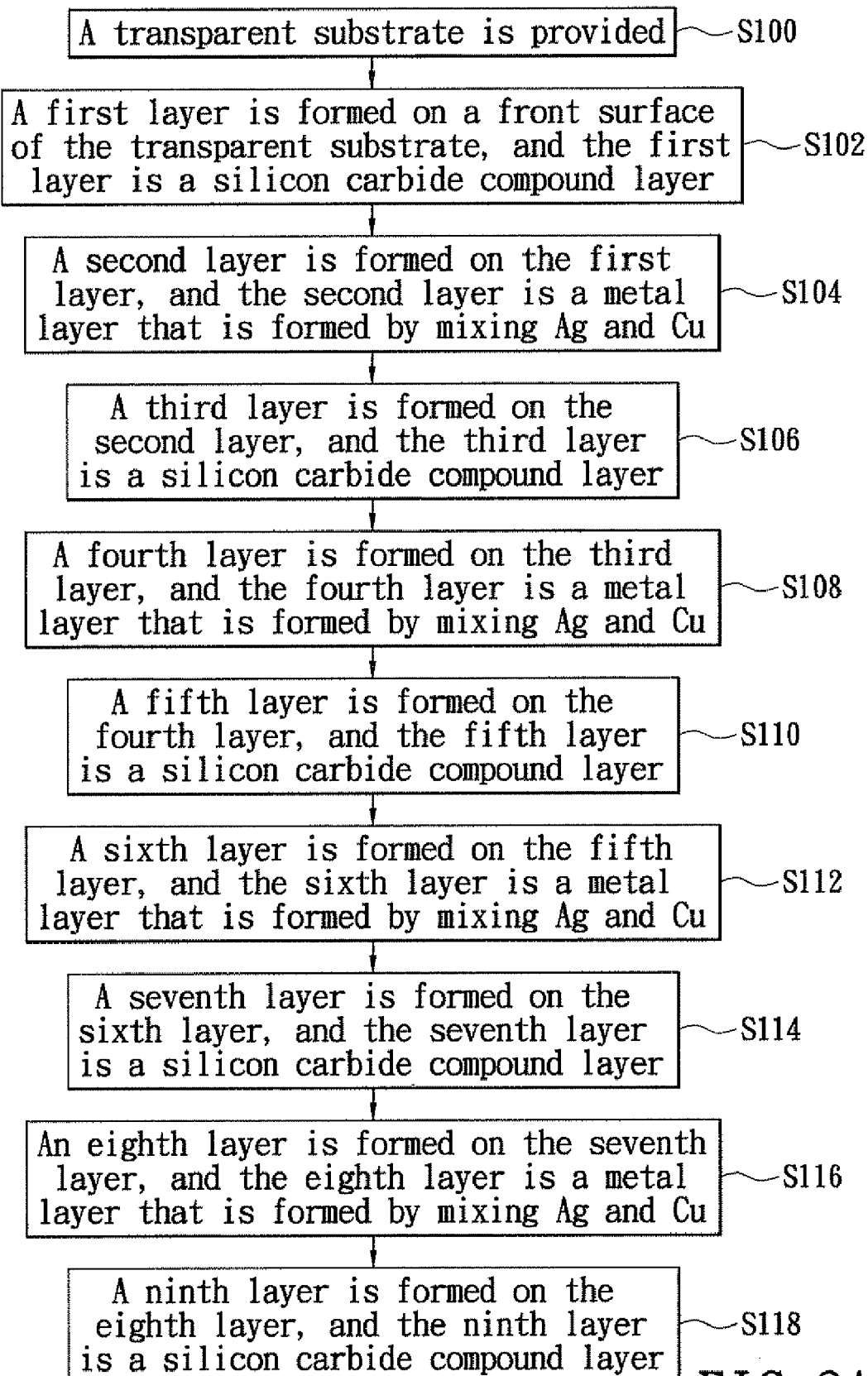
FIG. 2A is a flowchart of a method for manufacturing a multilayer film structure for increasing transmittance according to the first embodiment of the present invention.

Referring to FIG. 2A, the first embodiment of the present invention provides a method for manufacturing a multilayer film structure for increasing transmittance. The method includes:

S100: a transparent substrate Sa is provided;

S102: a first layer 1a is formed on a front surface of the transparent substrate Sa, and the first layer 1a is a silicon carbide compound layer (dielectric layer);

S104: a second layer 2a is formed on the first layer 1a, and the second layer 2a is a metal layer that is formed by mixing Ag and Cu;

S106: a third layer 3a is formed on the second layer 2a, and the third layer 3a is a silicon carbide compound layer;

S108: a fourth layer 4a is formed on the third layer 3a, and the fourth layer 4a is a metal layer that is formed by mixing Ag and Cu;

S110: a fifth layer 5a is formed on the fourth layer 4a, and the fifth layer 5a is a silicon carbide compound layer;

S112: a sixth layer 6a is formed on the fifth layer 5a, and the sixth layer 6a is a metal layer that is formed by mixing Ag and Cu;

S114: a seventh layer 7a is formed on the sixth layer 6a, and the seventh layer 7a is a silicon carbide compound layer;

S116: an eighth layer 8a is formed on the seventh layer 7a, and the eight layer 8a is a metal layer that is formed by mixing Ag and Cu; and S118: a ninth layer 9a is formed on the eighth layer 8a, and the ninth layer 9a is a silicon carbide compound layer.

Figure 2B:
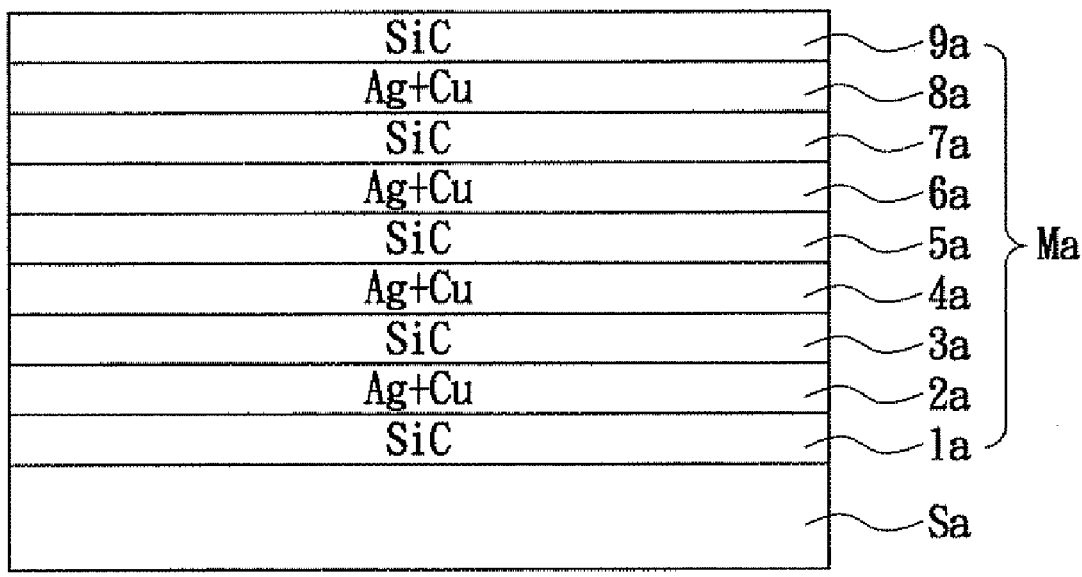
FIG. 2B is a lateral, schematic view of a multilayer film structure for increasing transmittance according to the first embodiment of the present invention.

Referring to FIGS. 2A and 2B, the first embodiment of the present invention provides a multilayer film structure for increasing transmittance, including: a transparent substrate Sa and a multifunctional film module Ma. The transparent substrate Sa can be a plastic film or a glass sheet. The multifunctional film module Ma can be a basic coating for a plasma display or a liquid crystal display.

Moreover, the multifunctional film module Ma includes a first layer 1a formed on a front surface of the transparent substrate Sa, a second layer 2a formed on the first layer 1a, a third layer 3a formed on the second layer 2a, a fourth layer 4a formed on the third layer 3a, a fifth layer 5a formed on the fourth layer 4a, a sixth layer 6a formed on the fifth layer 5a, a seventh layer 7a formed on the sixth layer 6a, an eighth layer 8a formed on the seventh layer 7a, and a ninth layer 9a formed on the eighth layer 8a.

Furthermore the first layer 1a, the third layer 3a, the fifth layer 5a, and the seventh layer 7a and the ninth layer 9a are dielectric layers. The second layer 2a, the fourth layer 4a, the sixth layer 6a, and the eighth layer 8a are metal layers. In addition, each dielectric layer is a silicon carbide compound layer such as SiC, and each metal layer is formed by mixing Ag and Cu. The refractive index of each silicon carbide compound layer is larger than the refractive index of each metal layer.

Therefore, the multifunctional film module Ma is formed on a front surface of the transparent substrate Sa and is composed of a plurality of silicon carbide compound layers and a plurality of metal layers. The silicon carbide compound layers and the metal layers are alternately stacked onto each other, and each metal layer is formed by mixing at least two metals such as Ag and Cu.

Moreover, the refractive indexes of the first layer 1a, the third layer 3a, the fifth layer 5a, and the seventh layer 7a and the ninth layer 9a are 2.6. The refractive indexes of the second layer 2a, the fourth layer 4a, the sixth layer 6a, and the eighth layer 8a are between 0.1 and 0.5. Furthermore, the thickness of the first layer 1a is 30 nm, the thickness of the second layer 2a is between 10 and 18 nm, the thickness of the third layer 3a is 66 mm, the thickness of the fourth layer 4a is between 10 and 18 nm, the thickness of the fifth layer 5a is 60 nm, the thickness of the sixth layer 6a is between 10 and 18 nm, the thickness of the seventh layer 7a is 70 nm, the thickness of the eighth layer 8a is between 10 and 18 nm, and the thickness of the ninth layer 9a is 40 nm.

In addition, the first layer 1a, the third layer 3a, the fifth layer 5a, the seventh layer 7a, and the ninth layer 9a (the silicon carbide compound layers) are formed by a DC or AC magnetron sputtering method or election Bean Evaporation process. The second layer 2a, the fourth layer 4a, the sixth layer 6a, and the eighth layer 8a (the metal layers) are formed by a DC or AC magnetron sputtering method or election Bean Evaporation process. Moreover, all of the layers (from the first layer 1a to the ninth layer 9a) are formed by an in-line or roll-to-roll vacuum sputtering method.

Figure 2C:
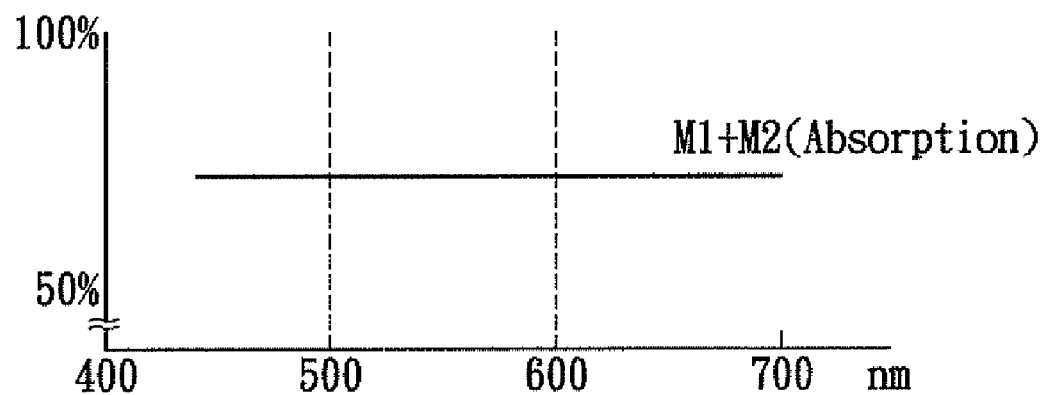
FIG. 2C is a property diagram showing the relationship between the transmittance of light passing through a metal layer with Ag and Cu and the light wavelength according to the first embodiment of the present invention.

Referring to FIG. 2C, the transmittance of light passing through the metal layer that is formed by mixing Ag and Cu is shown as a horizontal line in spectrogram. In other words, the light-absorbing coefficient of the metal layer with Ag and Cu is shown as a horizontal line.

Figure 2D:
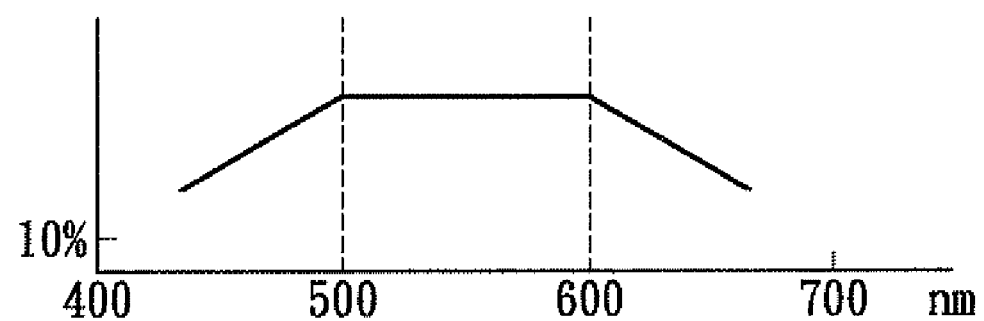
FIG. 2D is a property diagram showing the relationship between the transmittance of light passing through a multilayer film structure with the metal layer of FIG. 2C and the light wavelength according to the first embodiment of the present invention.

Referring to FIG. 2D, the present invention uses a multifunctional film module Ma (in order to generate some functions such as anti-EMI, anti-reflection and near infrared rays) as a sputtering layer formed on a transparent substrate Sa. The multifunctional film module Ma includes a metal layer formed by mixing at least two metals such as Ag and Cu. Hence, the transmittance of light passing through a metal layer formed by mixing at least two metals such as Ag and Cu is shown as a horizontal line in spectrogram (as shown in FIG. 2C), so that the spectrogram of the multifunctional film module Ma is shown as a trapezoid shape (as shown in FIG. 2D).

Figure 1A:
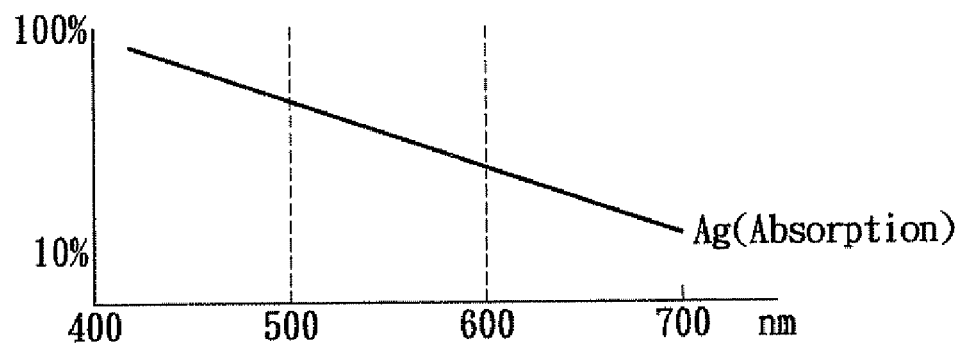
FIG. 1A is a property diagram showing the decreasing relationship between the transmittance of light passing through Ag and the light wavelength according to the prior art.
Figure 1B:
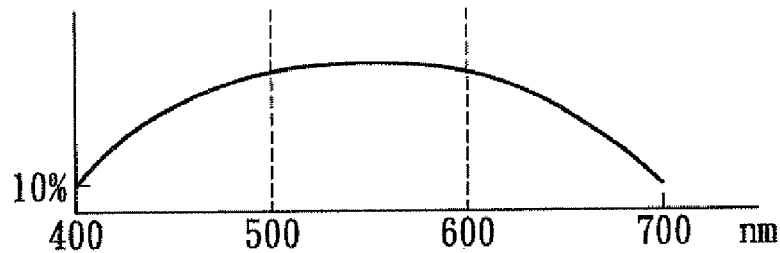
FIG. 1B is a property diagram showing the relationship between the transmittance of light passing through a processed glass and the light wavelength according to the prior art.
Figure 1C:
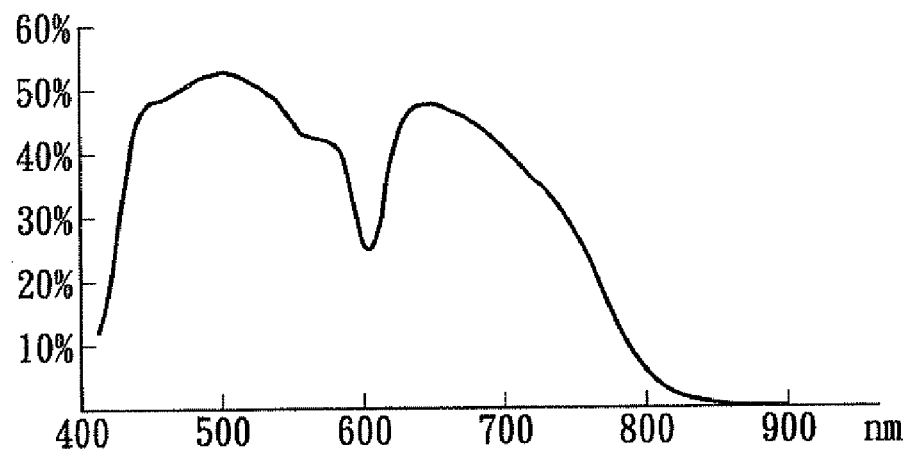
FIG. 1C is a property diagram showing the relationship between the transmittance of light passing through a PDP filter with the processed glass of FIG. 1B and the light wavelength according to the prior art.
Figure 2E:
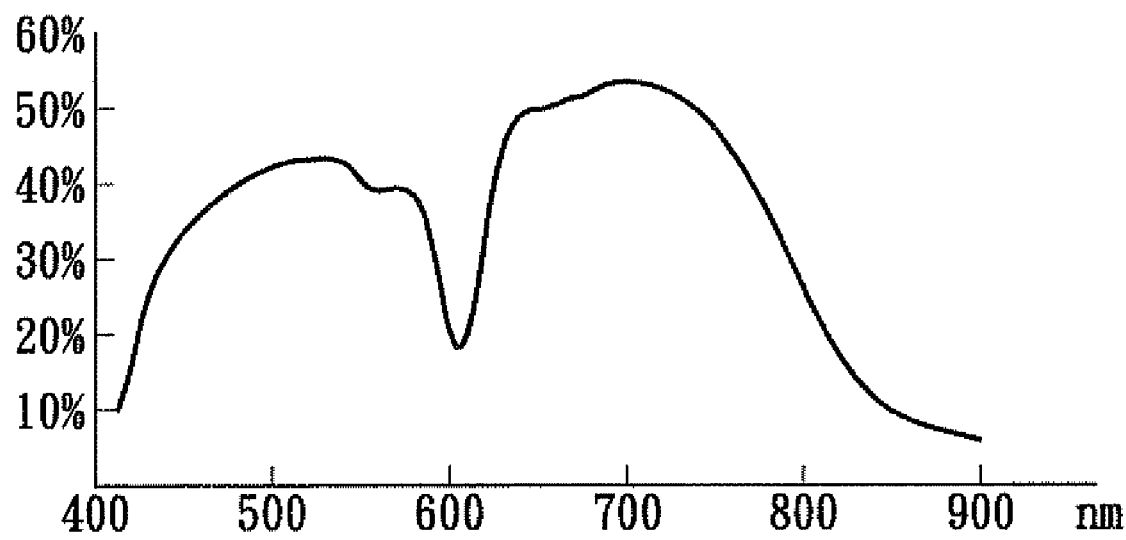
FIG. 2E is a property diagram showing the relationship between the transmittance of light passing through a PDP filter with the multilayer film structure of FIG. 2D and the light wavelength according to the first embodiment of the present invention.

Referring to FIG. 2E, the width of the anti-reflection wavelength area as shown in FIG. 2E is larger than the width of the anti-reflection wavelength area as shown in FIG. 1C.

Figure 3A:
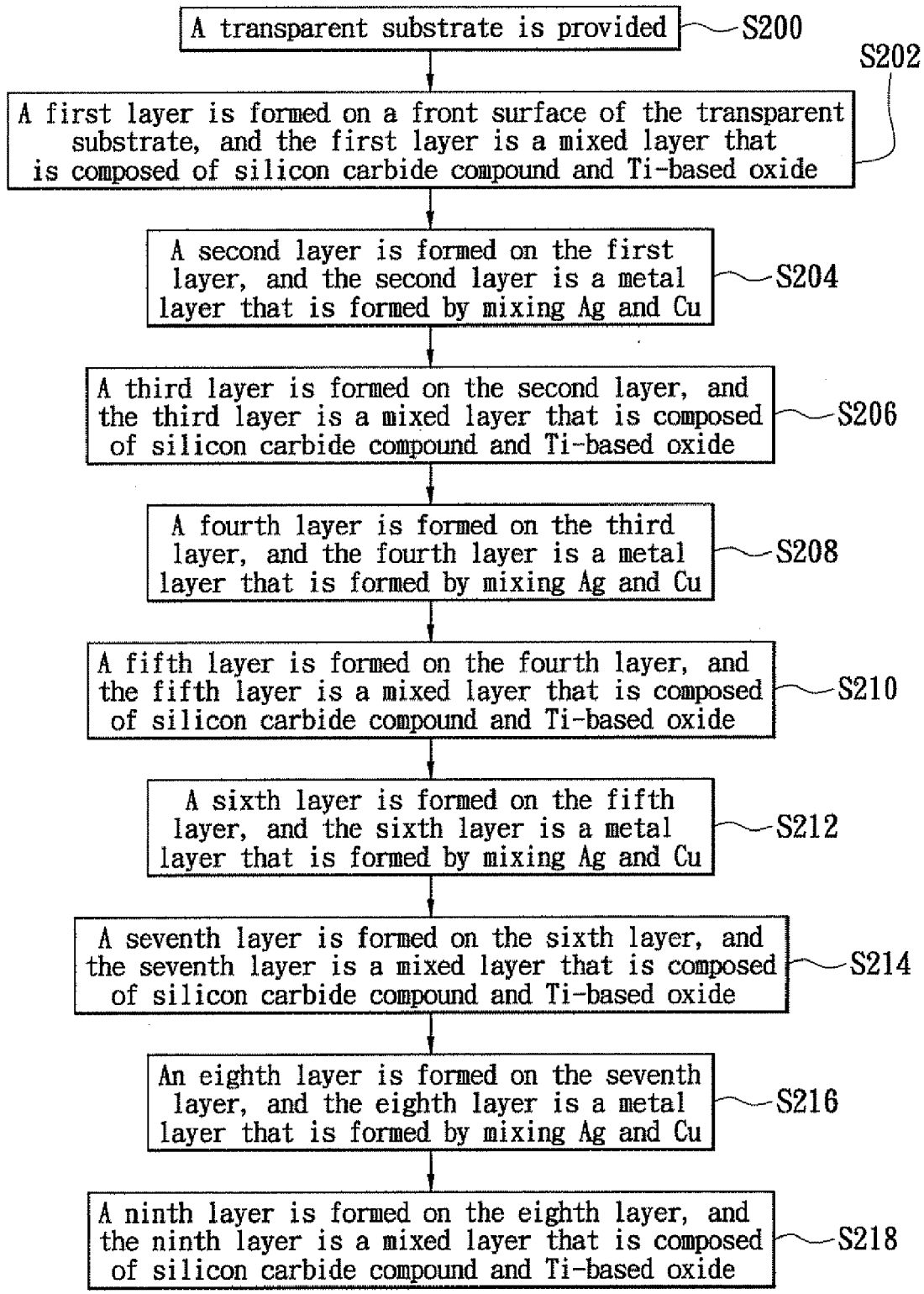
FIG. 3A is a flowchart of a method for manufacturing a multilayer film structure for increasing transmittance according to the second embodiment of the present invention.
Figure 3B:
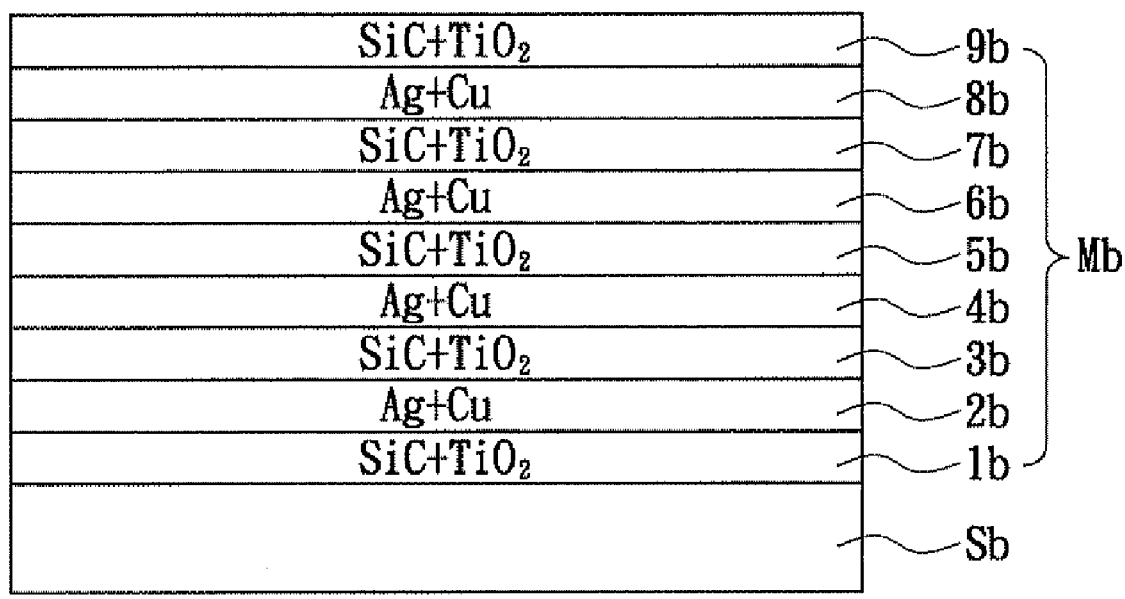
FIG. 3B is a lateral, schematic view of a multilayer film structure for increasing transmittance according to the second embodiment of the present invention.

Referring to FIGS. 3A and 3B, the second embodiment of the present invention provides a method for manufacturing a multilayer film structure for increasing transmittance. The method includes:

S200: a transparent substrate Sb is provided;

S202: a first layer 1b is formed on a front surface of the transparent substrate Sb, and the first layer 1b is a mixed layer (dielectric layer) that is composed of silicon carbide compound and Ti-based oxide;

S204: a second layer 2b is formed on the first layer 1b, and the second layer 2b is a metal layer that is formed by mixing Ag and Cu;

S206: a third layer 3b is formed on the second layer 2b, and the third layer 3b is a mixed layer that is composed of silicon carbide compound and Ti-based oxide;

S208: a fourth layer 4b is formed on the third layer 3b, and the fourth layer 4b is a metal layer that is formed by mixing Ag and Cu;

S210: a fifth layer 5b is formed on the fourth layer 4b, and the fifth layer 5b is a mixed layer that is composed of silicon carbide compound and Ti-based oxide;

S212: a sixth layer 6b is formed on the fifth layer 5b, and the sixth layer 6b is a metal layer that is formed by mixing Ag and Cu;

S214: a seventh layer 7b is formed on the sixth layer 6b, and the seventh layer 7b is a mixed layer that is composed of silicon carbide compound and Ti-based oxide;

S216: an eighth layer 8b is formed on the seventh layer 7b, and the eight layer 8b is a metal layer that is formed by mixing Ag and Cu; and S218: a ninth layer 9b is formed on the eighth layer 8b, and the ninth layer 9b is a mixed layer that is composed of silicon carbide compound and Ti-based oxide.

Therefore, the first layer 1b, the second layer 2b, the third layer 3b, the fourth layer 4b, the fifth layer 5b, the sixth layer 6b, the seventh layer 7b, the eighth layer 8b and the ninth layer 9b are combined together to form a multifunctional film module Mb.

Hence, the difference between the second embodiment and the first embodiment is that: in the second embodiment, each dielectric layer is a mixed layer that is composed of silicon carbide compound and Ti-based oxide, each silicon carbide compound is SiC, each Ti-based oxide is $TiO_2$, and each metal layer is formed by mixing Ag and Cu. In addition, the ratio of the silicon carbide compounds to the Ti-based oxides is 40% to 60%, and each mixed layer has a refractive index larger than that of each metal layer.

Figure 4A:
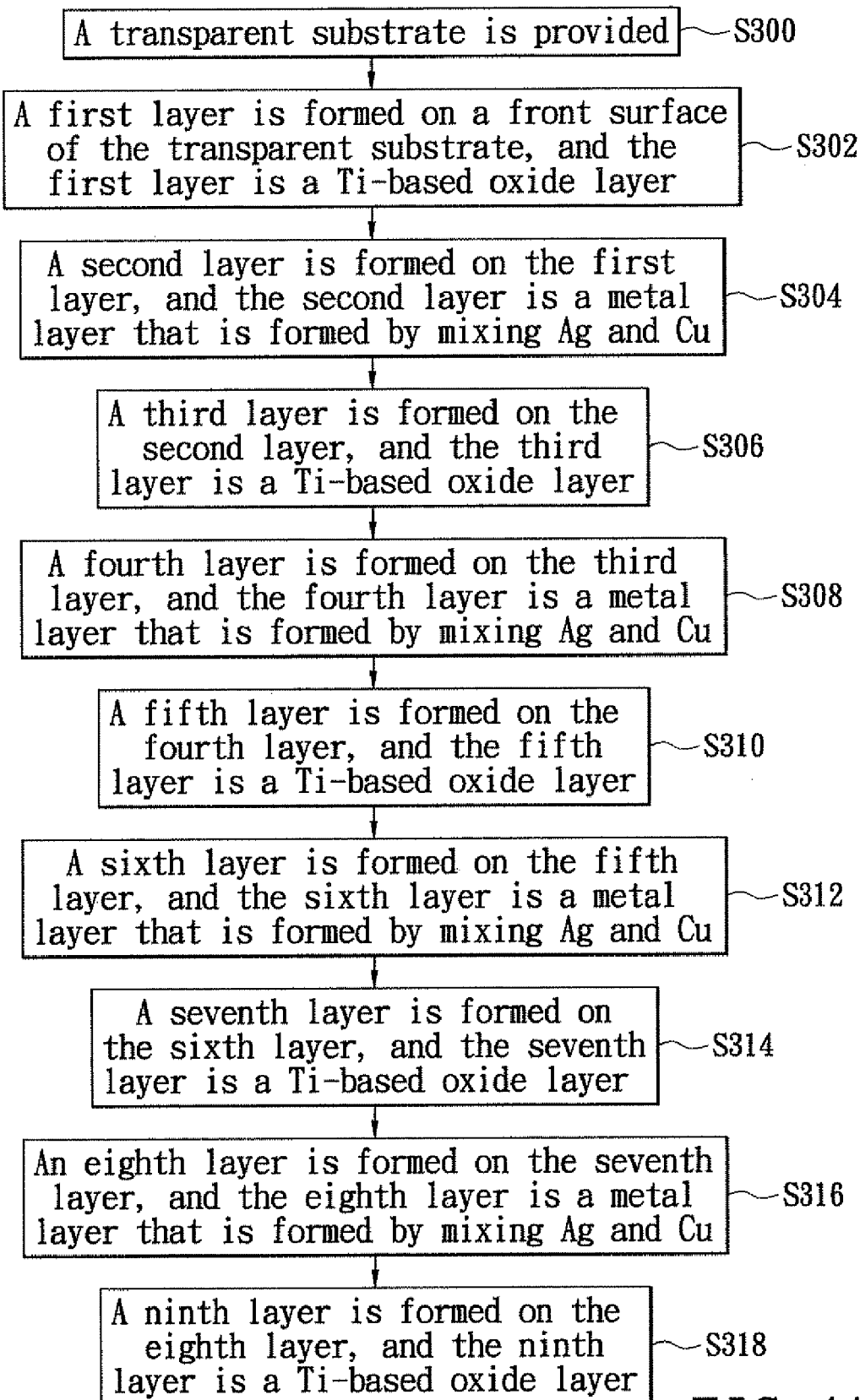
FIG. 4A is a flowchart of a method for manufacturing a multilayer film structure for increasing transmittance according to the third embodiment of the present invention.
Figure 4B:
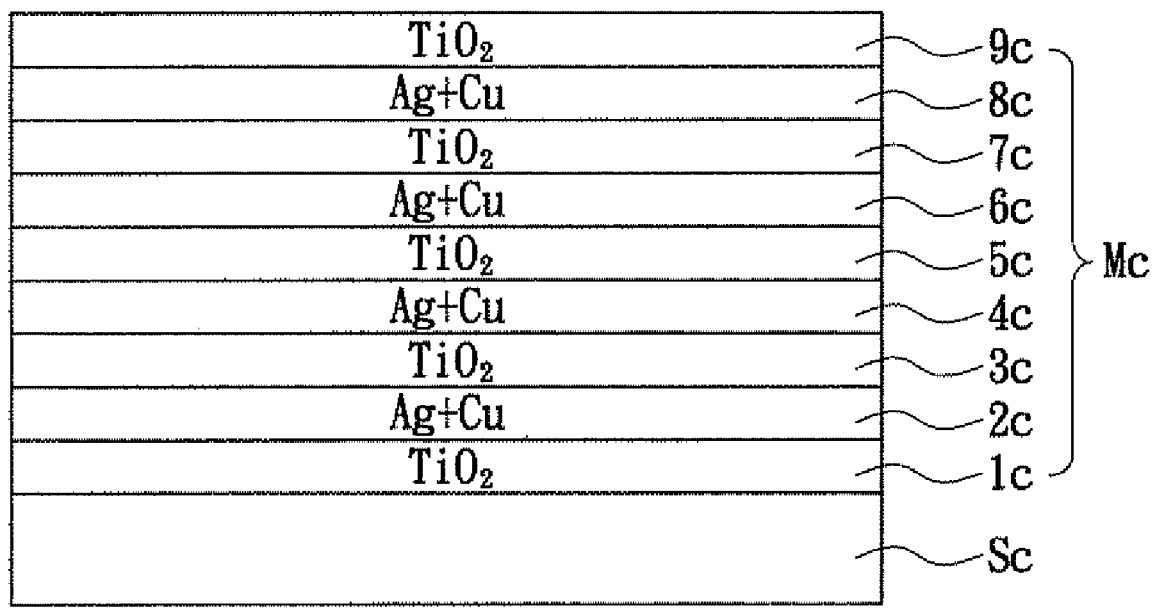
FIG. 4B is a lateral, schematic view of a multilayer film structure for increasing transmittance according to the third embodiment of the present invention.

Referring to FIGS. 4A and 4B, the third embodiment of the present invention provides a method for manufacturing a multilayer film structure for increasing transmittance. The method includes:

S300; a transparent substrate Sc is provided;

S302: a first layer 1c is formed on a front surface of the transparent substrate Sc, and the first layer 1c is a Ti-based oxide layer (dielectric layer);

S304: a second layer 2c is formed on the first layer 1c, and the second layer 2c is a metal layer that is formed by mixing Ag and Cu;

S306: a third layer 3c is formed on the second layer 2c, and the third layer 3c is a Ti-based oxide layer;

S308: a fourth layer 4c is formed on the third layer 3c, and the fourth layer 4c is a metal layer that is formed by mixing Ag and Cu;

S310: a fifth layer 5c is formed on the fourth layer 4c, and the fifth layer 5c is a Ti-based oxide layer;

S312: a sixth layer 6c is formed on the fifth layer 5c, and the sixth layer 6c is a metal layer that is formed by mixing Ag and Cu;

S314: a seventh layer 7c is formed on the sixth layer 6c, and the seventh layer 7c is a Ti-based oxide layer;

S316: an eighth layer 8c is formed on the seventh layer 7c, and the eight layer 8c is a metal layer that is formed by mixing Ag and Cu; and S318: a ninth layer 9c is formed on the eighth layer 8c, and the ninth layer 9c is a Ti-based oxide layer.

Therefore, the first layer 1c, the second layer 2c, the third layer 3c, the fourth layer 4c, the fifth layer 5c, the sixth layer 6c, the seventh layer 7c, the eighth layer 8c and the ninth layer 9c are combined together to form a multifunctional film module Mc.

Hence, the difference between the third embodiment and above-mentioned embodiments is that: in the third embodiment, each dielectric layer is a Ti-based oxide layer that is $TiO_2$, and each metal layer is formed by mixing Ag and Cu. In addition, each Ti-based oxide layer has a refractive index larger than that of each metal layer.

Figure 5A:
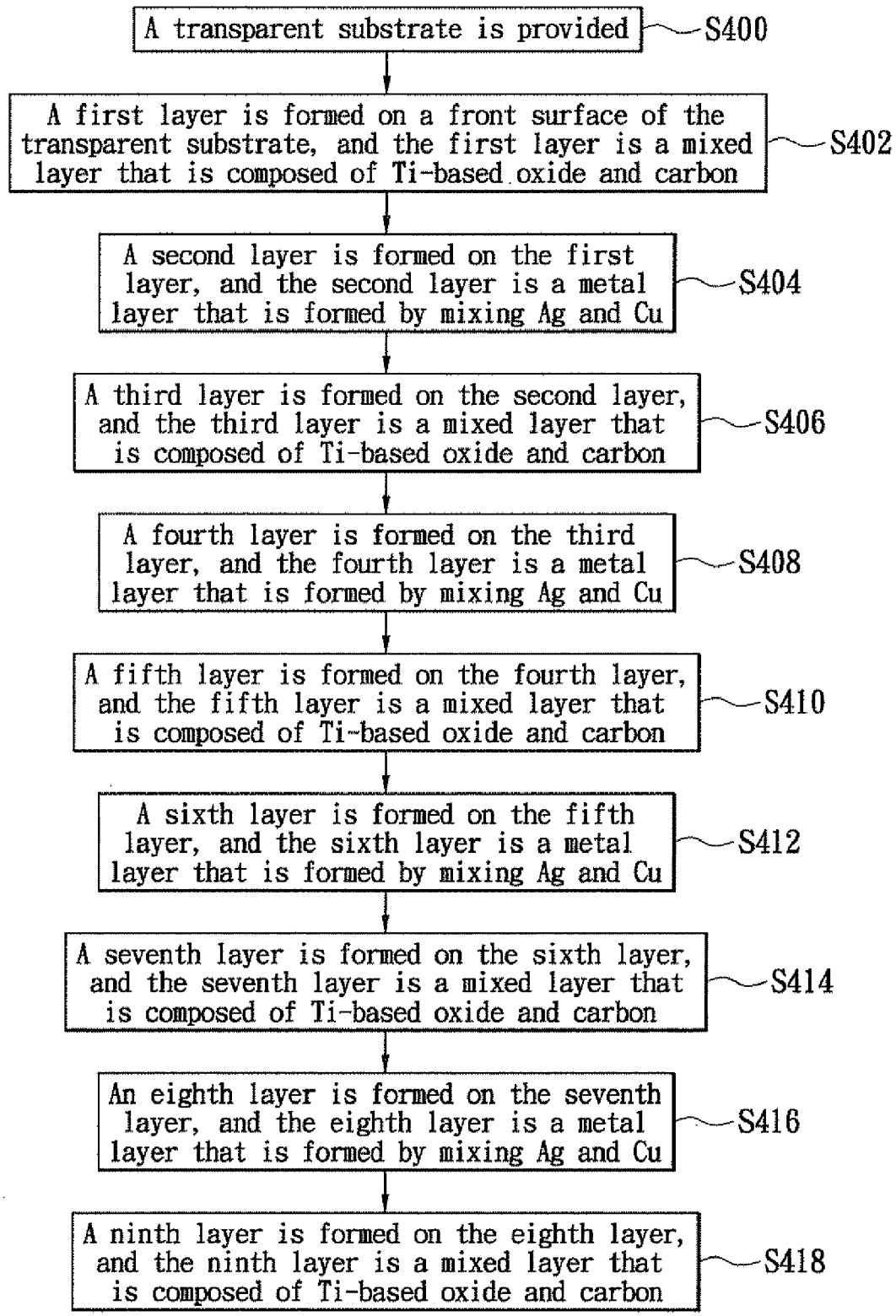
FIG. 5A is a flowchart of a method for manufacturing a multilayer film structure for increasing transmittance according to the fourth embodiment of the present invention.
Figure 5B:
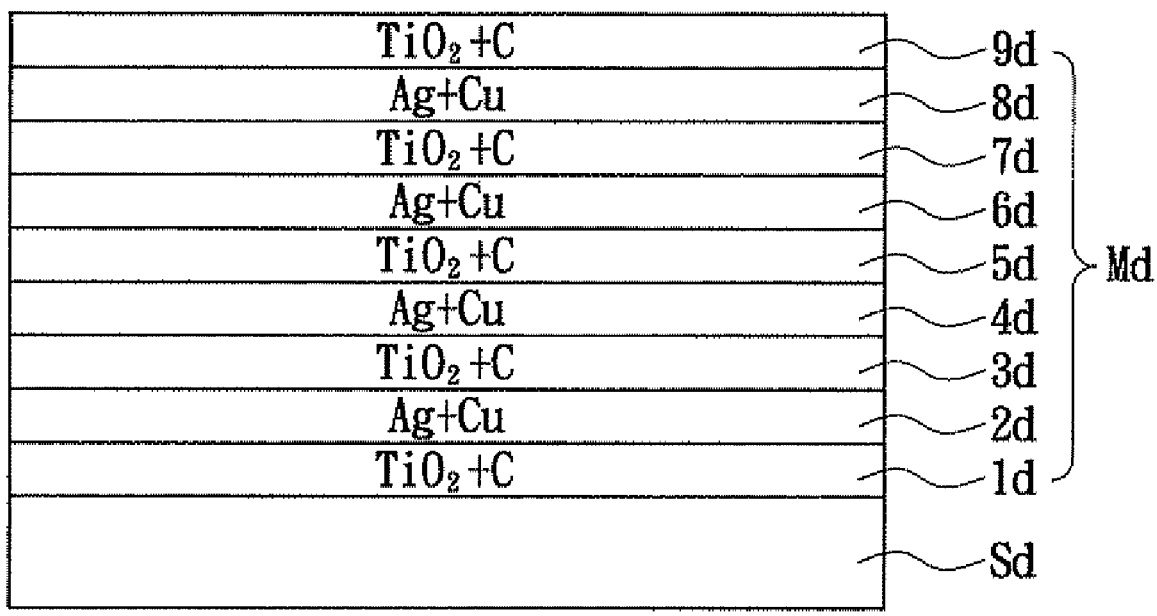
FIG. 5B is a lateral, schematic view of a multilayer film structure for increasing transmittance according to the fourth embodiment of the present invention.

Referring to FIGS. 5A and 5B, the fourth embodiment of the present invention provides a method for manufacturing a multilayer film structure for increasing transmittance. The method includes:

S400: a transparent substrate Sd is provided;

S402: a first layer 1d is formed on a front surface of the transparent substrate Sd, and the first layer 1d is a mixed layer (dielectric layer) that is composed of Ti-based oxide and carbon;

S404: a second layer 2d is formed on the first layer 1d, and the second layer 2d is a metal layer that is formed by mixing Ag and Cu;

S406: a third layer 3d is formed on the second layer 2d, and the third layer 3d is a mixed layer that is composed of Ti-based oxide and carbon;

S408: a fourth layer 4d is formed on the third layer 3d, and the fourth layer 4d is a metal layer that is formed by mixing Ag and Cu;

S410: a fifth layer 5d is formed on the fourth layer 4d, and the fifth layer 5d is a mixed layer that is composed of Ti-based oxide and carbon;

S412: a sixth layer 6d is formed on the fifth layer 5d, and the sixth layer 6d is a metal layer that is formed by mixing Ag and Cu;

S414: a seventh layer 7d is formed on the sixth layer 6d, and the seventh layer 7d is a mixed layer that is composed of Ti-based oxide and carbon;

S416: an eighth layer 8d is formed on the seventh layer 7d, and the eight layer 8d is a metal layer that is formed by mixing Ag and Cu; and S418: a ninth layer 9d is formed on the eighth layer 8d, and the ninth layer 9d is a mixed layer that is composed of Ti-based oxide and carbon.

Therefore, the first layer 1d, the second layer 2d, the third layer 3d, the fourth layer 4d, the fifth layer 5d, the sixth layer 6d, the seventh layer 7d, the eighth layer 8d and the ninth layer 9d are combined together to form a multifunctional film module Md.

Hence, the difference between the fourth embodiment and above-mentioned embodiments is that: in the fourth embodiment, each dielectric layer is a mixed layer that is composed of Ti-based oxide and carbon, each Ti-based oxide is $TiO_2$ and each metal layer is formed by mixing Ag and Cu. In addition each mixed layer has a refractive index larger than that of each metal layer.

Hence, the transmittance of light passing through the metal layer that is formed by mixing at least two metals such as Ag and Cu is shown as a horizontal line in spectrogram, so that the spectrogram of the multifunctional film module is shown as a trapezoid shape.

Although the present invention has been described with reference to the preferred best molds thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A multilayer film structure for increasing transmittance, comprising:
   a transparent substrate; and
   a multifunctional film module formed on a front surface of the transparent substrate and composed of a plurality of dielectric layers and a plurality of metal layers, wherein the dielectric layers and the metal layers are alternately stacked on top of each other, and each metal layer is formed by mixing at least two metals, wherein each dielectric layer is a mixed layer substantially composed of silicon carbide compound and Ti-based oxide, wherein the ratio of the silicon carbide compounds to the Ti-based oxides is substantially 40% to 60%, and each mixed layer has a refractive index larger than that of each metal layer.

2. The multilayer film structure as claimed in claim 1, wherein each silicon carbide compound is SiC, each Ti-based oxide is $TiO_2$, and each metal layer is formed by mixing Ag and Cu.

3. The multilayer film structure as claimed in claim 1, wherein the transparent substrate is a plastic film or a glass sheet, and the multifunctional film module is a basic coating for a plasma display or a liquid crystal display.

4. A method for manufacturing a multilayer film structure for increasing transmittance, comprising:
   providing a transparent substrate; and
   forming a multifunctional film module on a front surface of the transparent substrate, wherein the multifunctional film module is composed of a plurality of dielectric layers and a plurality of metal layers, the dielectric layers and the metal layers are alternately stacked on top of each other, and each metal layer is formed by mixing at least two metals, wherein each dielectric layer is a mixed layer substantially composed of silicon carbide compound and Ti-based oxide, wherein the ratio of the silicon carbide compounds to the Ti-based oxides is substantially 40% to 60%, and each mixed layer has a refractive index larger than that of each metal layer.

5. The method as claimed in claim 4, wherein each silicon carbide compound is SiC, each Ti-based oxide is $TiO_2$, and each metal layer is formed by mixing Ag and Cu.

6. The method as claimed in claim 4, wherein the transparent substrate is a plastic film or a glass sheet, and the multifunctional film module is a basic coating for a plasma display or a liquid crystal display.

* * * * *